May 27, 1924.　　　　　　　　　　　　　　　　1,495,240
I. O. BAUER

UPHOLSTERY BINDING

Filed July 9, 1923

Inventor:
Irvin O. Bauer
By Wood & Wood
Attorneys

Patented May 27, 1924.

1,495,240

UNITED STATES PATENT OFFICE.

IRWIN O. BAUER, OF CINCINNATI, OHIO.

UPHOLSTERY BINDING.

Application filed July 9, 1923. Serial No. 650,347.

*To all whom it may concern:*

Be it known that I, IRWIN O. BAUER, a citizen of the United States, and residing at Cincinnati, in the county of Hamilton and State of Ohio, have invented a new and useful Improvement in Upholstery Bindings, of which the following specification is a full disclosure.

This invention relates to upholstery binding or flexible fabric moulding particularly used for vehicle tops and upholstery trimming or binding.

An object of the invention is to improve the utility and appearance of the type of upholstery binding shown and described in prior Letters Patent issued to me April 23, 1918, No. 1,263,734, employing a flap for covering and concealing the tacks or fasteners securing the binding for use, and in providing a flap which can be manipulated to occupy a self-sustaining upturned position for exposing the surface of the binding through which the fasteners are driven, facilitating applying and securing the binding, and can be readily and conveniently turned down to its closed position which it normally retains.

Other features and objects of the invention will be readily apparent and included in the description of the accompanying drawings forming a part hereof, wherein.

Figure 1:
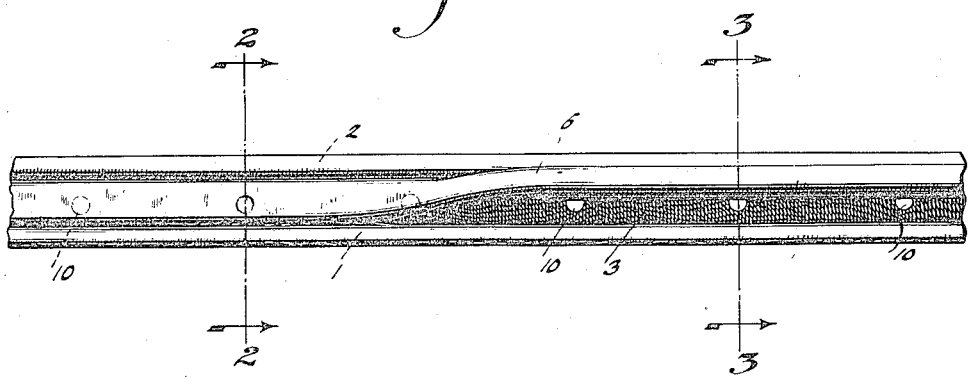
Figure 1 is a plan view of a sample length of the improved binding as applied, showing a portion of the tack covering flap upturned.
Figure 2:
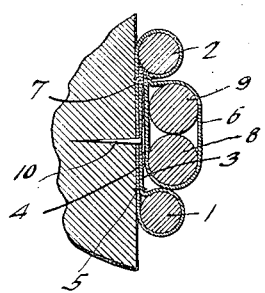
Figure 2 is an enlarged section on line 2—2, of Figure 1.
Figure 3:
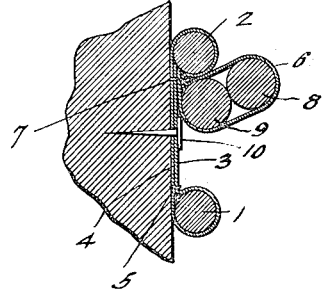
Figure 3 is an enlarged section on line 3—3, of Figure 1.

While the invention is particularly applicable to the construction of binding shown and described in said prior patent and embraced herein, it obviously, may apply to any type of binding or flexible fabric moulding possessing a flap for which occasion would be found to have the same retained in an upturned position.

The construction shown is formed of a single width of tape or band strip of material folded upon itself and about filler cords extending longitudinally of the strip to form beaded or raised edges and the folds stitched together, resulting in providing a body portion of plural ply and a double ply or tubular flap enclosing a plurality of loosely inserted filler cords.

The tape material is folded upon itself from the opposite longitudinal ends and respectively about filler cords 1, 2, spaced apart for the desired width of the finished binding or moulding forming a base portion of two plies or layers with rounded, beaded, or raised edges, giving to the base a channel structure, within which the cover flap snugly lies and is confined. The material is lap folded along one end over a filler cord 1 bringing a lap as a second layer 3 over a base layer 4. The lap extends to the inner side of the filler cord 2 at the opposite edge of the moulding, and the two layers are stitched together as at 5 along the inner side of the filler cord 1 securely binding the cord. Along the opposite end the material is folded about the filler cord 2, and then to the form of a tube 6 as a flap swinging upwardly from a line of stitches 7 along the inner side of the filler cord 2. The flap is filled with filler cords 8, 9 loosely inserted and preferably of larger diameter than the filler cords 1, 2 to give greater height to the flap or intermediate portion of the moulding adding to the design of the product. The flap in its normal or turned down position fills the channel of the body portion, into which it is pressed to assist in retaining the flap in its turned down position. The cords 8, 9 being loosely inserted within the tubular flap permits one cord to be rolled upon the other so as to sustain the flap from a closed position parallel with the body of the moulding to a position at an angle thereto exposing the intermediate portion of the body so that the tacks 10 can be driven through the body beneath the flap. After tacking, the flap can be readily turned down by the mechanic drawing his thumb over the raised edge of the flap forcing the outermost cord 8 downwardly bringing the flap again within the channel.

The advantages afforded are readily apparent to the user and the use of special tools for holding up the flap while the moulding is being applied is obviated. The cords reinforce the flap and increase the stiffness of the moulding, as well as adding to the ornamental value of the product.

Having described my invention, I claim:

1. An upholstery binding comprising a fabric material formed to provide a strip having a body portion and a longitudinal tubular flap upon one side of the body extending lengthwise thereof, and filler cords loosely inserted in said tubular flap adapted to be shifted upon one another for sustaining the flap from a position in plane with body portion to a position at an angle thereto.

2. An upholstery binding comprising a strip of fabric material folded and stitched to provide a plural ply base and a tubular flap upon one side of the base, and filler cords within the tubular flap relatively free to be shifted one upon the other in upturning the flap and sustaining the flap in position wherein the base portion normally covered by the flap is exposed.

3. An upholstery binding comprising a strip of fabric material having a tubular flap upon one side thereof, and filler cords within the flap relatively free to be shifted one upon the other in upturning the flap for sustaining the flap in a position to expose the portion of the strip normally covered by the flap.

In witness whereof, I hereunto subscribe my name, as attested by the two subscribing witnesses.

IRWIN O. BAUER.

Witnesses:
R. KISTNER,
FRANCIS E. ALDEN.